(12) United States Patent
Madsen

(10) Patent No.: US 9,861,543 B2
(45) Date of Patent: Jan. 9, 2018

(54) DATALOGGER IN HOSPITAL OR CARE BED

(71) Applicant: LINAK A/S, Nordborg (DK)

(72) Inventor: Allan H. Madsen, Sønderborg (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 14/652,334

(22) PCT Filed: Dec. 13, 2013

(86) PCT No.: PCT/DK2013/000088
§ 371 (c)(1),
(2) Date: Jun. 15, 2015

(87) PCT Pub. No.: WO2014/090254
PCT Pub. Date: Jun. 19, 2014

(65) Prior Publication Data
US 2016/0184153 A1 Jun. 30, 2016

(30) Foreign Application Priority Data
Dec. 14, 2012 (DK) .................. 2012 00791

(51) Int. Cl.
G05B 23/00 (2006.01)
A61G 7/018 (2006.01)
A61G 7/015 (2006.01)

(52) U.S. Cl.
CPC ............. A61G 7/018 (2013.01); A61G 7/015 (2013.01); G05B 2219/2608 (2013.01)

(58) Field of Classification Search
CPC ........................................................ H04Q 9/00
USPC ........................................................ 360/3.31
See application file for complete search history.

(56) References Cited

U.S. PATENT DOCUMENTS

| 5,483,223 | A | * | 1/1996 | Pedtke | ................... | G08B 29/12 340/514 |
| 7,066,041 | B2 | | 6/2006 | Nielsen | | |
| 7,962,981 | B2 | | 6/2011 | Lemire et al. | | |
| 8,198,981 | B2 | * | 6/2012 | Ablabutyan | .......... | B60P 1/4471 318/466 |
| 2011/0148577 | A1 | * | 6/2011 | Wolter | ................... | G10K 1/342 340/6.1 |
| 2013/0300233 | A1 | | 11/2013 | Loley | | |
| 2014/0066815 | A1 | * | 3/2014 | Williamson | .......... | A61B 5/6892 600/595 |

* cited by examiner

Primary Examiner — Carlos E Garcia
(74) Attorney, Agent, or Firm — Dykema Gossett PLLC

(57) ABSTRACT

A communication system for exchanging data between an actuator system and an external device, e.g. an operation where the communication system under the form of a gateway and a transcoder interprets the information in a bidirectional stream of data and distributes the information to both ends. The communication system is furthermore provided with a logger function, where the signals that are sent out to both sides of the gateway, are stored in a memory, so that the actions and signals that lead to an alteration on the actuator can later be reconstructed.

9 Claims, 2 Drawing Sheets

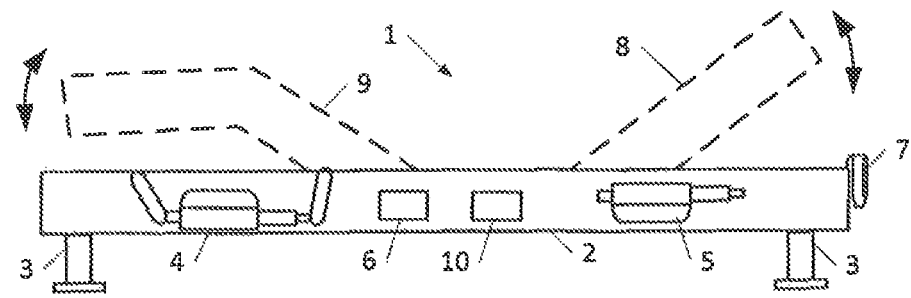
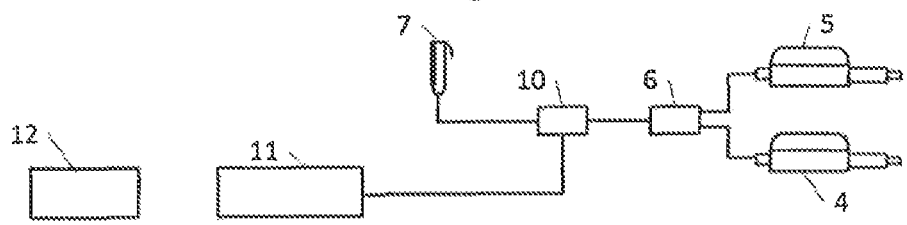
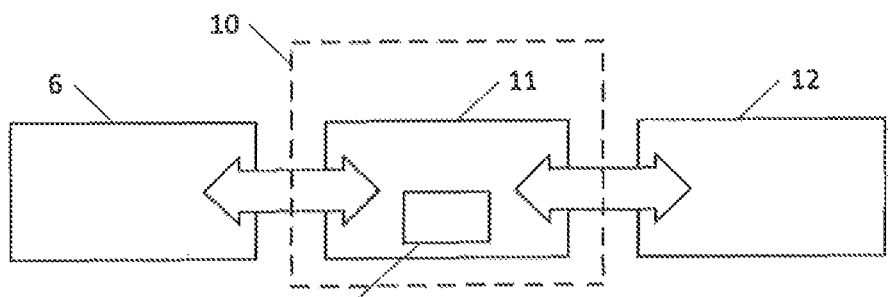
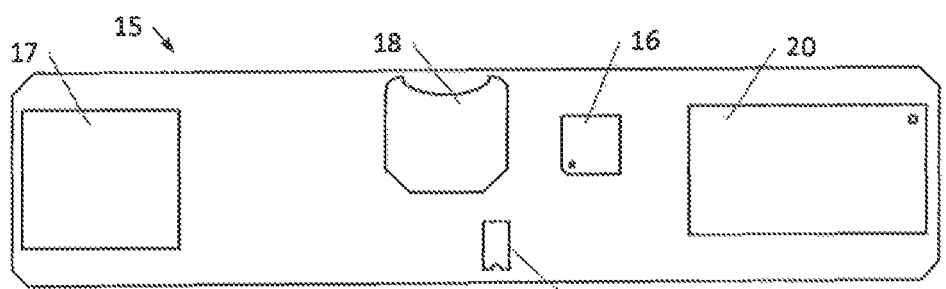
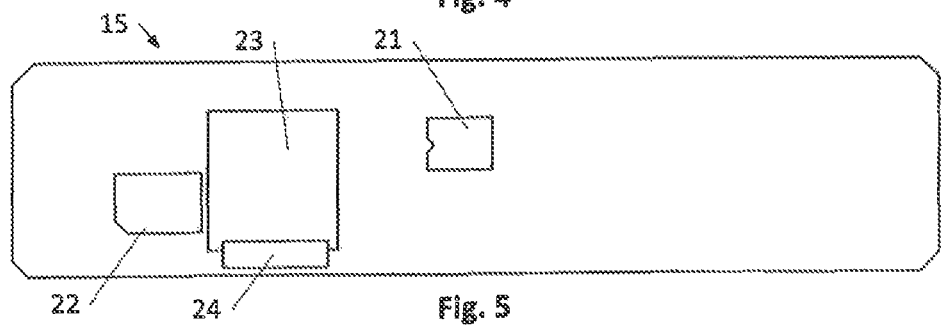

DATALOGGER IN HOSPITAL OR CARE BED

The present invention relates to an electric actuator system comprising a linear actuator, a controller and a power supply. The electric actuator system is provided with an interface with connection means for receiving a signal or transmitting a signal, whereby the electric actuator system can be operated and monitored. By connection means is intended any possibility of connection between the actuator system and external equipment. It can both be wireless or wired.

The electric actuator system is well suited for use in adjustable beds such as hospital or care beds. The mattress in those kinds of beds is supported by a supporting surface that can be raised and lowered with the aid of the linear actuators, which are fitted in the electric actuator system. Furthermore, the back rest and leg rest sections of the beds can also be adjusted with the aid of linear actuators. The linear actuators are primarily of the type comprising a piston rod, as described e.g. in WO 02/29284 A1 to Linak A/S.

As explained above, the electric actuator systems are supplied as sub-contracted goods for manufacturers of hospital and care beds. The bed manufacturers often wish to use their own operating and monitoring devices. It might also be required that the bed and therewith the actuator system can be connected to a hospital system to be able to monitor the bed and control it remotely.

Depending on the condition of the patient using the bed, an unintentional adjustment of the bed can be hazardous or cause great inconvenience to the patient. For example, a person with a fracture of the musculoskeletal system may sustain severe injury if the profile of the surface he is lying on is suddenly adjusted. Such situations are called adverse events and refer to occurrences in the health care sector. Adverse events include previously known and unknown events and failures that are not caused by the patient's illness and that are either damaging or may have been damaging. The latter is also called 'near miss events'. In order to avoid adverse events it is often possible to block activation of one or more functions in the actuator system. The block can be carried out by e.g. installing a mechanical or electrical lock mechanism, which is designed in connection with the operating device or the controller. Despite this blocking, adverse events still occur on or in connection with beds comprising an electric actuator system. For the sake of the patient's subsequent treatment, future avoidance of similar events and whether the situation has been dealt with wrongful, it is important to be able to achieve clarity regarding the course of events. Since many beds comprise a number of complex electric systems, including actuator systems, this can now be difficult to determine. In electric actuator systems it can for example be difficult to determine whether it was the controller or the operating device that failed, or whether there is any suggestion of human error. This clarification can be made difficult if the hospital's communications system also has access to communicate with the actuator system and remotely control it.

Although adverse events in or in relation to hospital beds or care beds are rare, the consequences of these incidents may be great. There is therefore a need to be able to provide full or virtually full information regarding the course of the event on or in connection with a hospital or care bed, up to the occurrence of the adverse event.

This is achieved according to the invention in that the actuator system is provided with means for registering and storing the information, which is exchanged via the interface of the actuator system with connection means.

Should an adverse event occur, where it is difficult to determine what caused the incident to occur, it will be possible to read and decipher the information and determine what operations or failures were decisive. It will therefore be easier to determine liability.

In one embodiment, the actuator system is provided with a communication interface for communication between the controller and connected devices that are equipped to transmit or receive a signal from the controller.

The information exchanged via the actuator system's interface with connection means can in its simplest form be an input signal from an operating device. The signal can be in form of a voltage or a current or be formed when the operating device opens or closes an electrical contact. The signal triggers an action from the controller, which in a simple form can respond by activating an electric actuator or enabling a connection means, functioning as an output, changing its state and being able to operate a connected device.

By providing the actuator system with a communication interface for communication between the controller and the connected devices that are equipped to transmit or receive a signal from the controller, the advantage is achieved that a manufacturer of a device in which an actuator system is included is able, in a simpler way, to adapt his or her system to use a standard actuator system with a standard controller. This provides obvious advantages in relation to production of electric actuator systems and reduction of costs.

In one particular embodiment, the communication interface is equipped to be able to communicate with the devices by converting the stream of signals or bi-directional data that is communicated between the controller and the connected devices that are equipped to transmit or receive a signal to or from the controller, according to a clearly defined pattern in a protocol.

The communication interface thereby takes care of converting signals between the controller and the connected device so that a manufacturer can use his own equipment in the form of operating and monitoring devices, sensors, lights, sound emitters, etc. in connection with the actuator system. The communication interface thereby works as a junction box with the possibility of connecting the bed-manufacturer's own devices.

In more detail, the connected devices that are equipped to transmit a signal to or receive a signal from the actuator system could be one or more of the following:
- an operating device for operating the actuator system,
- a sensor for receiving a signal,
- a surveillance device for monitoring the actuator system,
- a monitor showing the settings of the actuator system,
- a contact for activating a connected device,
- a sound emitter,
- a light source,
- a network connection,
- a device for data processing, for example a computer.

An operating device could be a device for activating the actuator system. If the actuator system is used in connection with a bed, there might be a plurality of operating devices with different sets of options at the disposal of the patient, the nursing personnel, the service personnel and personnel within the medical profession. In another embodiment the operation unit can comprise a plurality of user interfaces in the same device.

The connection of a sensor to an actuator system could be an optical light sensor for detecting the lighting condition in a room, to automatically activate orientation lighting such as when a light source is arranged under a bed. Another example may be a bedwetting sensor to alert caregivers that there is need for their help. These are only examples of sensors used in connection with a bed and should therefore not be considered a complete list of sensor types that can be connected to an actuator system.

A communication interface can also communicate information that can be presented on an information display for monitoring the actuator system. As an example, the information presented could be a graphic image that shows the setting of the actuator system and possibly the structure, e.g. a bed, in which the actuator system is installed. In case the actuator system is used in a bed, the information communicated can express the setting of the adjustable sections of the bed or be data relating to a patient, such as data in the form of measurements of temperature, movement, weight, etc.

Even a simple connection means such as a contact for activating a connected device can be managed via the communication interface. An example of such a contact can be an emergency button or a light switch. It can also be a contact for blocking or locking a function in connection with the actuator system.

Another device that could be connected is an acoustic sound emitter, which can function as an alarm or as a loudspeaker in connection with an intercom or a PA system.

In yet another embodiment, the connected device could be a light source that is either provided through the communication interface or activated, but supplied via a central power source.

Although the connection means are presented here in their simplest form, it should be noted that each individual piece of equipment can be provided with its own unique identification code that can be based on hardware or on software, which communicate data that is embedded in a microcomputer, so that the device can be recognised by the communication interface.

Another connection means could be a network connection. In this way it is possible to communicate data (status) as well as to manage and monitor the actuator system remotely. Ideally, this function will be managed by a data processing device, such as a computer, which might be a hospital system of a type that collects one or more beds provided with actuator systems in one central monitoring, wherein this central monitoring can be provided with a remote control option.

The actuator system's interface with connection means can be either wired or wireless. This means that a device can either be connected to the controller or to the communication interface via electrical or optic wiring or through wireless radio technology.

With regard to the means for registering and storing the information that is exchanged with the actuator system, it is equipped for registering and storing the communication that takes place between the communication interface and the controller and/or the communication that takes place between the communication interface and the connected devices that are equipped to transmit a signal to or receive a signal from the actuator system. By registering and storing on one hand the communication that takes place between the controller and the communication interface, and similarly registering and storing what is happening on the other side of the communication interface in the connected device, it is possible subsequently to retrieve information about course of events leading up to an adverse event.

In order to be able to in a simple way to integrate the means to register and store the communication, it can be designed as a part of the controller and/or as a part of the communication device. The means constitute a data recorder, which in principle be managed by the microcomputer which manages the logical processes in the controller. The communication interface also has its own microcomputer that can be used for this purpose. Using the microcomputer that handles the function of the communication interface, has obvious advantages, since the communication interface is connected both to the controller and the connected equipment. If the means (the data recorder) is equipped with its own microcomputer, however, advantages are achieved in that the data recorder will be able to function independently of the controller, the communication interface and the connected equipment. In one embodiment, the data recorder could be designed as a printed circuit board extension that can be added to the controller or the interface. The data recorder might, in another embodiment, be designed directly as part of the printed circuit board constituting the controller or the communication interface. If the function is not required, befitting the components on the printed circuit board can be omitted.

Furthermore, the data recorder or the means of recording and storing the communication is equipped to store information in a memory, which is designed in connection with the controller, the communication interface or a separate memory device, such as for example a PCB memory. It is desirable if the information can also be extracted by the recorder, if finding the cause for an adverse event is necessary. Depending on the embodiment of the printed circuit board, it can either be removed for reading the data, or the printed circuit board can include a slot for a standard memory card that can be removed and read by a PC. Since memory cards have a limited life span and are expensive compared to memory chips, a solution based on an embedded memory chips may be preferable. This can be memory integrated into the microcomputer and could be read with a tool such as for example JTAG. The memory should of course be of a kind that does not lose data when de-energized.

In yet another embodiment the data recorder is designed as a stick or a plug inserted into a connection means as for example a connection port in the controller or the communication interface. This makes it easy to add the possibility for registering and storing the data in and/or to and from the actuator system.

In one embodiment, a connection means is a USB-memory dongle which is inserted into a connection port, after which the data recorder transfers data from its internal memory to the USB-memory. Thereupon the data can be processed and read with the aid of a computer.

The data recorder can also be physically introduced into the connection that links the controller to the communication interface. This makes sense when the two devices are placed in their own physical enclosures with a cable running between them. If one wishes subsequently to extract data from the date of order, the device is simply removed from the actuator system and the data is read with a suitable reader.

The information that is stored for each event can be one or more of the following:
 a timestamp,
 an identification of a transmitter and a receiver (a controller, a communication interface or a connected device) in the form of a unique identifier such as a MAC with the associated SW number and SW embodiment,
 ping signals and confirmations (is the system alive?)
 voltage level in the actuator system and the interface, clock and data signals,
control data or information data in the data package,
changes in the configuration of connections in the communication interface (ID and mapping)
communication failure between the communication interface and the controller regarding a connected device.

In connection with clarifying the time of the incident an RTC (Real Time Clock) or other similarly reliable timing methods can be used.

The system is further more equipped in such a way that it can be configured to only store data that is of interest. Depending on the size of the memory, it could also be possible to limit the number of stored events, so that the system will at least keep the newest information.

The invention also relates to hospital beds or care beds comprising the electric actuator system. This makes sense since the problem formulated in the introduction to this application is based on an adverse event in or in connection with a bed and the desire to be able to reconstruct the course of events leading up to the adverse event.

An embodiment of the actuator system according to the invention will in what follows be described in further detail with reference to the attached drawing, wherein:

FIG. 1 shows a schematic view of a care bed comprising an actuator system,

FIG. 2 shows a schematic view of the actuator system in the care bed shown in FIG. 1, FIG. 3 is a schematic diagram, showing a logging function arranged in relation to the actuator system.

FIG. 4 shows the placing of components in a printed circuit board for a data logger, FIG. 5 shows the placing of components in a printed circuit board for a data logger seen from behind.

Figure 6:
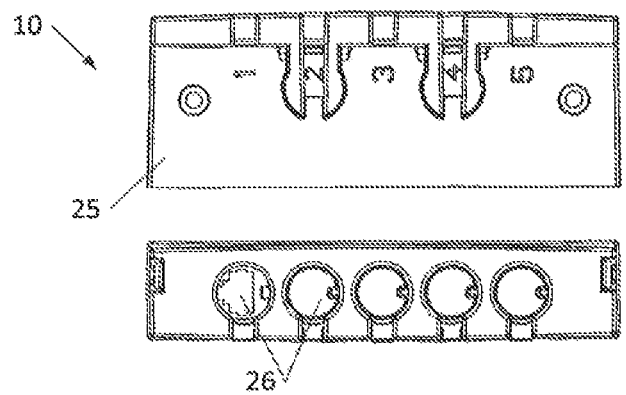
FIG. 6 shows a junction box comprising the logger module seen from below and from the plug connection side.

The care bed schematically shown in FIG. 1 comprises a mattress (not referenced), which is supported by a subframe 2. The subframe 2 then is supported by a set of legs 3. The care bed 1 has an actuator system (schematically represented in FIG. 2) that comprises two linear actuators 4, 5 connected to a control box 6 and an operating device 7. The control box 6 comprises a controller and a power supply. The linear actuators 4, 5 can adjust the bed's back rest section 8 and leg rest section 9. The actuator system has a network which is run as a serial data stream, to which data from the actuator system's devices can be converted and communicated. The network is powered by a microprocessor in the control box 6. The serial data stream is timed by a clock signal and the data stream transmits data packages that comprise an identification part and a data part.

The actuator system furthermore comprises a junction box (also known commercially under the label multi-junction box), that is connected between the control box and the operating device 7. The junction box 10 comprises means of monitoring the serial data stream of the network and time-recording means. The junction box 10 also comprises a gateway module 11 (see FIG. 2) that can communicate on the gateway with an external device 12 at a residential home, care home or hospital. The communication can be wired or wireless. In another embodiment, the actuator system, including the junction box 10, comprises a module that makes possible communication on the Internet, the mobile telephone network or through another wireless network. Regarding the gateway module 11, the interface to an external device can be wired or wireless, such as via Wi-Fi, for example WLAN or Bluetooth.

As shown in FIG. 3, the system is also provided with a logger module 13, which records and stores the information that is sent over the network's serial data stream. The logger module 13 is here arranged physically together with the gateway module 11, but the positioning is not limited thereto. The logger module 13 can be integrated directly into the gateway module 11 or as an extension. The logger module 13 is connected to the network in such a way to be able to read the information that is communicated through the network and is equipped to harvest information about both incoming and outgoing communication on multiple interfaces or boundaries. The embodiment shown in FIG. 3 is characterised in that the logger module 13 logs the data stream that is transmitted on both sides of the gateway module 11. The gateway module 11 works as an interpreter between the actuator system (see FIG. 2), for example with a control box 6 and an external device 12. It will therefore be possible subsequently to reconstruct the activations and events that have taken place in the actuator system. It will be possible to see what instructions were sent from an external device 12 associated with the actuator system that have led to activation of the actuator system. This is especially interesting in relation to investigating the causes of an adverse event in which a person has been harmed by an activation of the actuator system. Blocking a function, e.g. a function that activates the actuator system, can often be done directly on an operating device 7 or as a setting in the controller in the control box 6. If the function is still activated despite such a blockage, data in the logger module 13 will be able to reconstruct the course of events, which will make it possible to determine the cause of the event. This will help in determining liability.

In addition to registering the serial data stream, the logger module 13 is also equipped to store information on other parameters in the actuator system such as the voltage level on the data bus and the voltage level on selected power supplies in the actuator system. The output of a power supply can, for example, explain why an instruction from a third-party product was not carried out by the actuator system.

The logger module 13 registers whether system resources such as clock signals are functioning. The logger module also registers on an ongoing basis whether all the connected devices 6, 12 are alive and keeps a log over connections and disconnections of the connected devices, as well as over changes in the actuator system's configuration.

The logger module 13 can also be configured to store information regarding user-driven operations. The logger module 13 can, for example if a user activates an emergency call, register and store information on the data stream this has caused through the system. If the emergency call did not reach the caregivers, the cause can be determined subsequently by consulting the data in the logger module 13. It will thus be possible to determine liability.

The information that is logged can be divided into three main categories, each of them containing subcategories regarding what information (or data) will be stored (logged). The following information relates to the main categories and subcategories that will be stored:

1) External log (data between a gateway and a third party device)
    All data will be stored including MAC, SW number/embodiment, name and communication timeout.
    All pings will be stored
2) Internal log (the actuator system)

Measure and store PWR (on/off)
Measure and store V_BUS, V_Permanent (voltage)
Store clock and data (running and interruptions) of the communication bus
Store all changes in the communication bus (ID with or without service frame)
Store Control Box SW number/embodiment (at system start-up)

3) Log main gateway functions
Store information about communication links to internal devices (running and interruptions) for example whether there is connection between the microcomputer and the Bluetooth device.
Measure and store information on whether the logger module functions correctly (logs or dysfunctions). This information can possibly be stored in the microcomputer's flash memory or in another place.

All information will be stored and provided with a timestamp, timing the incident by stating the year, month, day, hour, minute and second of its occurrence. This timing does not have to be in real time, but the timer must never be stopped—neither by interruptions nor by power disruption.

FIG. 4 shows an electronic PCB 15 to be placed in a junction box 10. The electronic components for a gateway module 11 have been arranged on the PCB. The printed circuit board is furthermore equipped to be provided with the components that make up the data logger module 13, if the logger function is required. The gateway module 11 uses a microcomputer 16 for communication via the connector 17, which provides for the connection to the control box 6 and the other connectors that are available in the junction box 10. The microcomputer's power supply is normally through the connector 17, but is also provided with a battery backup 18, which in FIG. 4 is designed as a battery holder, wherein a battery button cell can be placed. The microcomputer is thereby able to perform a controlled shutdown in periods of power outage. The microcomputer 16 handles the interpretation and transmission of the information in the data stream between the control box 6 and the external connected device 12, and therefore makes up the core of the gateway module 11. Furthermore, the RTC (Real Time Clock) circuit provides the system with a signal that is used to create a timestamp. The RTC circuit 19 will continue to operate during power outages; power is supplied from a battery backup 18. Furthermore, a wireless communication module 20 has been arranged on the printed circuit board 15, which module is designed to communicate with an external device 12 via Bluetooth. The logger module 13 is also placed on the printed circuit board 15 and is based on the microcomputer 21 seen in FIG. 5, showing the other side of the PCB 15. The functions of the data logger 13 could also to this extent be handled by the microcomputer 16, which manages the gateway function, but keeping the logger's functions separated offers a great advantage as failures in the gateway module 11 can then also be registered and stored by the logger module 13. The microcomputer 21 can immediately use the battery back-up 18 so that the logger module can continue to operate even though the power supply fails. A timestamp will also be given, since the RTC circuit 19 is supplied by the battery back-up 18 in the case of a power outage. It should also be noted that the connection between microcomputer 16 and microcomputer 21 is retained in cases of a power failure, so logger module 13 is able to receive information from gateway module 11 about the communication failure before the micro computer is shut down. Moreover, the logger module can itself take care of measuring the supply voltage etc. independently of the microcomputer 16. The microcomputer 21 can be provided with an internal memory that saves data during power outages and which can later be accessed. When there is need for more memory, the PCB 15 can be provided with a memory circuit 22 or a memory card 23. To be able to mount the memory card, an SD cardholder 24 is mounted on the PCB 15. This makes it easier to extract data from the logger module and process data in the computer with the purpose of documenting what events led to an adverse event and thus what caused the incident to happen. This will help determine liability for the incident.

In order to ensure that the information that is kept in the logger module 13, is retained and kept from being manipulated, the logger module 13 can be constructed as shown in FIG. 6. Here, the logger module 13 is integrated in a junction box 10, which has a sealed enclosure 25, wherein the seal must be broken before data can be extracted. The sealed enclosure 25 thereby houses the junction box 10 with the connectors 26. A PCB 15, with the gateway module 11 and the logger module 13, is also arranged in the enclosure. The enclosure 25 is made of a plastic material, which is made up of two shells that are welded together.

When the logger module 13 is taken out, data can in an easy manner be extracted from it by removing the memory card, here described as an SD memory card 23, and fed into a device that is able to read data from the card such as a computer. The computer can furthermore be provided with a program able to present the data in a more readily understandable way. That said, the invention is not limited to the use of a memory card, but the logger function can also be provided with other form of memory as e.g. directly on a PCB mounted flash circuit, where data can be extracted via an interface to the logger or with a device such as a JTAG interface.

Figure 7:
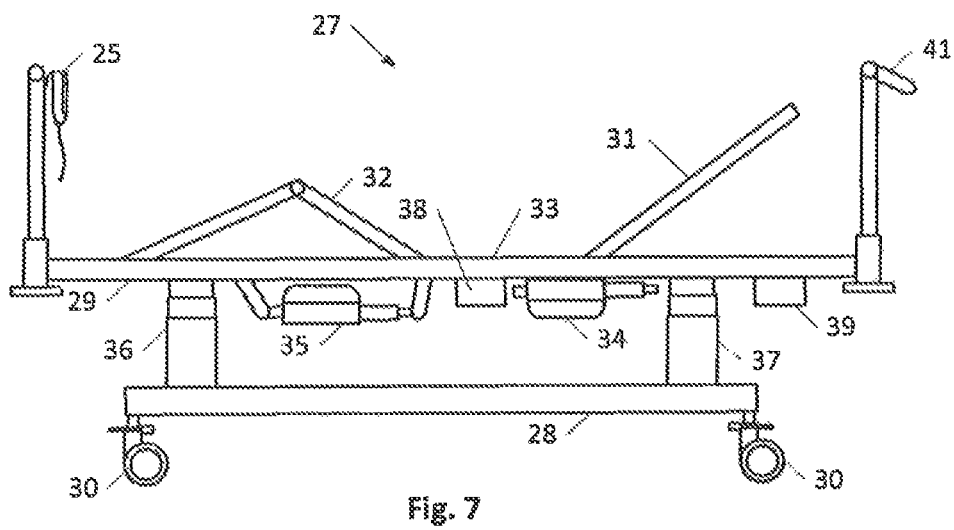
FIG. 7 shows a hospital or a care bed comprising an actuator system.

FIG. 7 shows a hospital bed 27 comprising a sub-frame 28 and an upper frame 29, wherein the sub-frame 28 is provided with castors 30. An adjustable supporting surface for a mattress is mounted on the upper frame 29. The supporting surface comprises a back rest section 31, a leg rest section 32 and a fixed middle section 33 therebetween. The back rest and leg rest sections 31, 32 can be adjusted each with its own linear actuator 34, 35 so that the supporting surface is able to adopt different contours. The upper frame 29 is connected to the sub-frame 28 with two linear actuators designed as lifting columns 36, 37. The actuators 34, 35, 36, 37 are connected to a control box 38 containing a power supply for connection to the mains, a rechargeable battery pack, and a controller.

To the control box 38 is connected a junction box 39 for connecting operating devices such as handsets 40, fixed operating panels or terminals 41 along with any other equipment. The devices of the actuator system i.e. the operating devices 40, 41, the actuators 34, 35, 36, 37, the control box 38, the junction box 39 and the other connected equipment communicate within a network that is run as a serial data stream to which all devices can convert data. The actuator system in the hospital bed 27 functions as described with regard to the care bed shown in FIG. 1.

The invention claimed is:

1. An electric actuator system comprising:
a linear actuator,
a controller,
a power supply,
an interface with connection means for receiving a signal or transmitting a signal, wherein the electric actuator system comprises means for registering and storing the information which is exchanged via the interface of the electric actuator system with connection means wherein said means for registering and storing the information is further configured to (i) provide the information with a timestamp indicating a time of occurrence relating to the information and (ii) store the timestamp with the stored information, wherein the stored information further includes an identification of transmitters and receivers in the form of a unique identifier, wherein the electric actuator system comprises a communication interface for communication between the controller and connected devices that are equipped to transmit or receive a signal from the controller, wherein one of said connected devices comprises an operating device for operating the electric actuator system, and wherein said means for registering and storing the information is further configured to store information comprising at least an input signal from the operating device configured to trigger an action from the controller.

2. The electric actuator system according to claim 1, wherein the communication interface communicates between the devices by use of and including means for converting the stream of signals or bi-directional data that is communicated between the controller and the connected devices that are equipped to transmit or receive a signal from the controller, according to a clearly defined pattern in a protocol.

3. The electric actuator system according to claim 1, wherein the connected devices that are equipped to transmit or receive a signal from the electric actuator system, can be further include one of or more of the following:
  a sensor for receiving a signal,
  a monitoring device for monitoring the electric actuator system,
  a monitor showing the setting of the electric actuator system,
  a contact for activating a connected device,
  a sound emitter,
  a light source,
  a network connection,
  a device for data processing, such as a computer.

4. The electric actuator system according to claim 1, wherein the interface electric actuator system with connection means is either wired or wireless.

5. The electric actuator system according to claim 1, wherein the means for registering and storing the information that is exchanged with the electric actuator system is further configured to register and store the communication that is transmitted between the communication interface and the controller and/or the communication that is transmitted between the communication interface and the devices that are equipped to transmit a signal to or receive a signal from the electric actuator system.

6. The electric actuator system according to claim 5, wherein the means for registering and storing the communication is designed as a part of the controller and/or as a part of the communication interface.

7. The electric actuator system according to claim 5, wherein the means to register and store the communication stores the information in a memory that is designed in connection to the controller, the communication interface or a separate memory device such as, for example, a memory printed circuit board.

8. The electric actuator system according to claim 7, wherein the means to register and store is further configured to store information stored for each event selected from the group comprising:
  the identification of transmitters and receivers (a controller, a communication interface or a connected device) in the form of a unique identifier such as a MAC with an associated SW number and a SW embodiment,
  ping signals and (handshake) confirmation (is the system alive?)
  voltage level on the electric actuator system and the interface,
  clock and data signals,
  control data or information data in the data package,
  changes in the configuration of connections on the communication interface (ID and mapping)
  communication failure/error between communication interface and controller regarding a connected device.

9. A hospital bed or care bed comprising the electric actuator system according to claim 1.

* * * * *